United States Patent [19]

Millerd, Jr. et al.

[11] Patent Number: 5,787,005
[45] Date of Patent: Jul. 28, 1998

[54] METHOD AND APPARATUS FOR SIGNAL THRESHOLD ADJUSTMENT THAT COMPENSATES FOR SIGNAL ASYMMETRY

[75] Inventors: Andrew B. Millerd, Jr., San Juan Capistrano, Calif.; Nobuyoshi Futatsugi, Nikko, Japan

[73] Assignee: Aiwa Co., Ltd., Tokyo, Japan

[21] Appl. No.: 644,434

[22] Filed: May 13, 1996

Related U.S. Application Data

[60] Provisional application No. 60/004,723, Oct. 2, 1995.

[51] Int. Cl.$^6$ ............................................. G11B 5/09
[52] U.S. Cl. ........................ 364/487; 364/481; 364/486; 364/550; 364/551.01; 364/571.01; 364/715.06; 360/46; 360/27; 360/62; 327/58; 327/62; 327/72; 324/76.11; 324/76.12; 324/103 R
[58] Field of Search ........................ 364/481, 486, 364/487, 550, 551.01, 571.01, 715.06; 324/76.11, 76.12, 103 R; 327/58, 62, 72; 360/27, 46, 53, 62, 65, 66

[56] References Cited

U.S. PATENT DOCUMENTS

| | | | |
|---|---|---|---|
| 4,651,105 | 3/1987 | Inbar | 327/58 |
| 4,771,188 | 9/1988 | Cheng et al. | 327/60 |
| 5,185,681 | 2/1993 | Volz et al. | 360/77.05 |
| 5,274,569 | 12/1993 | Prasad | 364/486 |
| 5,287,063 | 2/1994 | Izawa | 324/601 |
| 5,363,100 | 11/1994 | Bailey et al. | 341/132 |
| 5,438,460 | 8/1995 | Coker et al. | 360/46 |
| 5,440,433 | 8/1995 | Yun | 360/46 |
| 5,467,231 | 11/1995 | Nash et al. | 360/46 |
| 5,485,320 | 1/1996 | Vogel et al. | 360/31 |
| 5,495,368 | 2/1996 | Blatchley et al. | 360/46 |
| 5,508,855 | 4/1996 | Hutchins et al. | 360/46 |

Primary Examiner—James P. Trammell
Assistant Examiner—Tuan Q. Dam
Attorney, Agent, or Firm—Fulbright & Jaworski L.L.P.

[57] ABSTRACT

A method and apparatus for signal threshold adjustment that compensates for signal asymmetry which utilizes an algorithm to detect each side of an asymmetric signal independently to ensure that the proper signal detection point is used on both the high and low side of the asymmetric signal. In particular, the high side threshold is adjusted downwards a predetermined amount until detected, the high side threshold voltage is then recorded and reset to the maximum value. Correspondingly, the low side threshold is then adjusted upwards the predetermined amount until detected, the low side threshold voltage is then recorded and reset to the minimum value. The algorithm may be repeated to continuously monitor a signal. The gain of the read amplifier can then be accordingly adjusted by the controller such that it approximately equals the peak of the amplified reference burst to the predetermined value. The controller additionally utilizes the digital samples of the reference burst signal level for controlling the initial transverse position of the tape head assembly on the magnetic media.

25 Claims, 2 Drawing Sheets

METHOD AND APPARATUS FOR SIGNAL THRESHOLD ADJUSTMENT THAT COMPENSATES FOR SIGNAL ASYMMETRY

REFERENCE TO RELATED APPLICATION

This is a continuation of U.S. Provisional Application No. 60/004,723, filed Oct. 2, 1995.

BACKGROUND OF THE INVENTION

1. Field of the Invention

The present invention relates to signal detection, and more particularly to a method and apparatus for signal threshold adjustment that compensates for signal asymmetry.

2. Description of the Prior Art

Digital data is conventionally stored on magnetic media such as magnetic tape or diskette in the form of flux transitions on the surface of the media. A typical physical track layout of magnetic media includes data tracks written in parallel in the forward and reverse directions. Typically, prior to writing data on the first forward and reverse tracks, a reference pattern, commonly referred to as a reference burst, is written and read. The reference burst is usually an alternating current signal of fixed frequency and predetermined amplitude used for gain control of a read amplifier in the tape transport and positioning of the heads on the tape tracks. After reading the respective reference bursts, the forward and reverse read heads generate an output signal which is applied to a read amplifier in a peak hold circuit. The peak hold circuit determines the peak value of either of the reference bursts. The peak value is then digitized and applied to a tape transport controller which compares the peak value to a predetermined value stored therein. The gain of the read amplifier is accordingly adjusted by the controller such that it approximately equals the peak of the amplified reference burst to the predetermined value. The controller additionally utilizes the digital samples of the reference burst signal level for controlling the initial transverse position of the tape head on the tape.

Optimal gain control of the read amplifier and positioning of the heads on the tape tracks thus depends upon numerous factors, including accurate recovery of the reference bursts. Conventional systems used in the recovery of reference bursts provide signal threshold adjustment means which assume the presence of a symmetric signal. An analog signal that is biased to a specific voltage, however, can be asymmetric. In particular, the high (above bias) and low (below bias) sides of the signal can be at different absolute voltages. Thus, conventional systems fail to compensate for signal asymmetry. Consequently, the integrity of the information storage system may be compromised and information may be lost.

What is needed therefore is a simple method and apparatus for signal threshold adjustment that compensates for signal asymmetry.

SUMMARY OF THE INVENTION

The preceding and other shortcomings of prior art methods and systems are overcome by the present invention which a method and apparatus for signal threshold adjustment that compensates for signal asymmetry which utilizes an algorithm to detect each side of an asymmetric signal independently to ensure that the proper signal detection point is used on both the high and low side of the asymmetric signal. In particular, the high side threshold is adjusted downwards a predetermined amount until detected, the high side threshold voltage is then recorded and reset to the maximum value. Correspondingly, the low side threshold is then adjusted upwards the predetermined amount until detected, the low side threshold voltage is then recorded and reset to the minimum value. The algorithm may be repeated to continuously monitor a signal. The gain of the read amplifier can then be accordingly adjusted by the controller such that it approximately equals the peak of the amplified reference burst to the predetermined value. The controller additionally utilizes the digital samples of the reference burst signal level for controlling the initial transverse position of the tape head assembly on the magnetic media.

The present invention provides, in a first aspect, a program storage device readable by a machine, tangibly embodying a program of instructions executable by the machine to perform method steps for utilizing a head assembly for threshold adjustment of a signal which compensates for asymmetry. The method steps comprise setting a first threshold voltage to a first value and a second threshold voltage to a second value, adjusting the first threshold voltage in a first direction while monitoring the signal to detect a first portion of the signal, setting the first threshold voltage to a first value again when the first portion is detected, adjusting the second threshold voltage in a second direction opposite the first direction while monitoring the signal to detect a second portion of the signal, and setting the second threshold voltage to a second value again when the second portion is detected, wherein the first and second portions of the signal are detected independently, therefore ensuring proper signal detection.

In another aspect, the present invention provides a program storage device readable by a machine, tangibly embodying a program of instructions executable by the machine to perform method steps for utilizing a head assembly for threshold adjustment of a signal which compensates for asymmetry. The method steps comprise setting a high side threshold voltage to a maximum value and a low side threshold voltage to a minimum value, adjusting the high side threshold voltage downwards while monitoring the signal to detect an upper portion of the signal, setting the high side threshold voltage to a maximum value again when the upper portion is detected, adjusting the low side threshold voltage upwards while monitoring the signal to detect a lower portion of the signal, and setting the low side threshold voltage to a minimum value again when the lower portion is detected, wherein the upper and lower portions of the signal are detected independently, therefore ensuring proper signal detection.

In still another aspect, the present invention provides an apparatus, comprising a computer usable medium having computer readable program code means embodied therein for causing a head assembly for threshold adjustment of a signal which compensates for asymmetry. The computer readable program code means in the apparatus comprising computer readable program code means for causing a computer to effect set a high side threshold voltage to a maximum value and a low side threshold voltage to a minimum value, computer readable program code means for causing the computer to adjust the high side threshold voltage downwards while monitoring the signal to detect an upper portion of the signal, computer readable program code means for causing the computer to set the high side threshold voltage to a maximum value again when the upper portion is detected, computer readable program code means for causing the computer to adjust the low side threshold voltage upwards while monitoring the signal to detect a lower portion of the signal, and computer readable program code means for causing the computer to set the low side threshold voltage to a minimum value again when the lower portion is detected, wherein the upper and lower portions of the signal are detected independently, therefore ensuring proper signal detection.

The foregoing and additional features and advantages of this invention will become apparent from the detailed description and accompanying drawing figures that follow. In the figures and written description, numerals indicate the various features of the invention, like numerals referring to like features throughout for both the drawing figures and the written description.

DETAILED DESCRIPTION OF THE PREFERRED EMBODIMENT(S)

Figure 1:
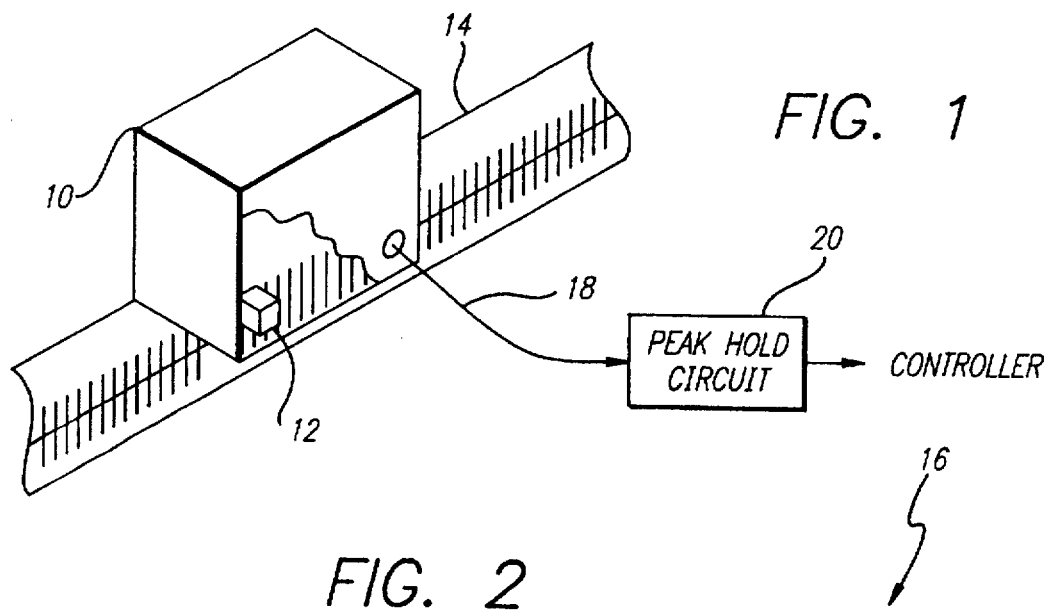
FIG. 1 is a diagram of a tape head surface, including read head, contacting a typical physical track layout of magnetic media.

The present invention provides a method and apparatus for detecting each side of an asymmetric signal independently to ensure that the proper signal detection point is used on both sides. Referring to FIG. 1, a tape head assembly 10 including a read head 12 detects the information stored on a magnetic media 14 as it moves by the read head 12 at a predetermined speed. Digital data is conventionally stored on magnetic media 14 in the form of flux transitions on the surface of the media 14. The magnetic media 14 may be a magnetic tape, diskette or other magnetic media. A typical physical track layout of magnetic media 14 includes data tracks written in parallel in the forward and reverse directions.

Figure 2:
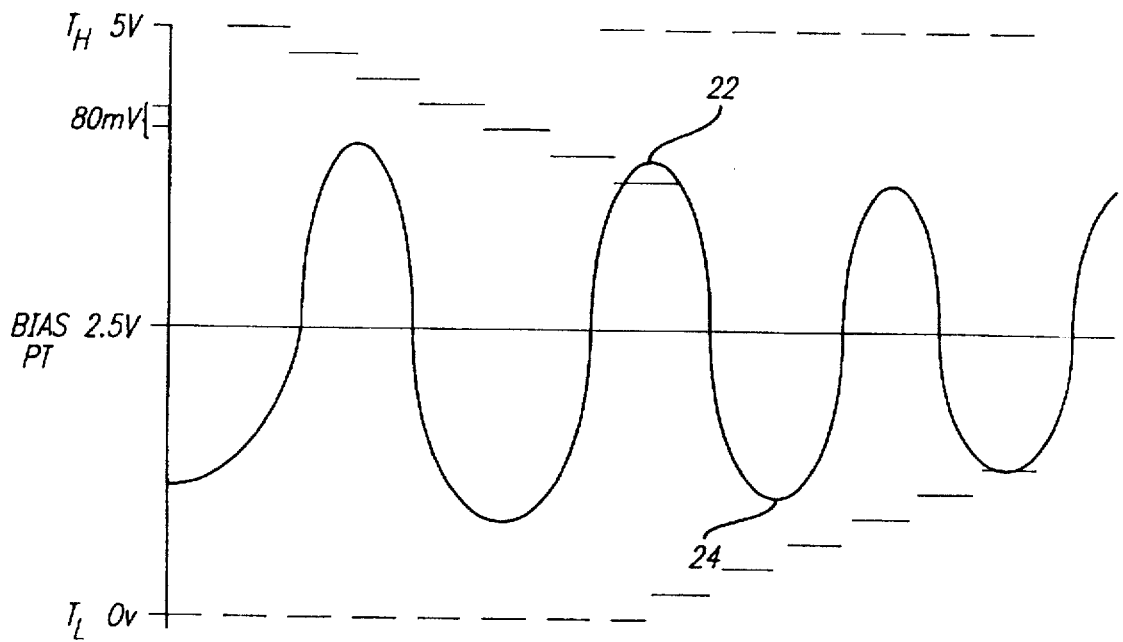
FIG. 2 is a diagram of an asymmetric signal which may be generated by the tape head surface shown in FIG. 1.

Referring to FIGS. 1 and 2, prior to writing data on the first forward and reverse tracks, a reference pattern, commonly referred to as a reference burst 16, is typically written and read. The reference burst 16 is usually an alternating current signal of fixed frequency and predetermined amplitude used for gain control of a read amplifier in the tape transport and positioning of the head assembly 10 on the magnetic media 14. After reading the respective reference bursts 16, the forward and reverse read heads 12 generate an output signal 18 which is applied to a read amplifier in a peak hold circuit 20. The peak hold circuit 20 determines the peak value 22 of either of the reference bursts 16. The peak value 22 is then digitized and applied to a tape transport controller which compares the peak value 22 to a predetermined value stored therein. The gain of the read amplifier is accordingly adjusted by the controller such that it approximately equals the peak of the amplified reference burst to the predetermined value. The controller additionally utilizes the digital samples of the reference burst signal level for controlling the initial transverse position of the tape head assembly 10 on the magnetic media 14.

Optimal gain control of the read amplifier and positioning of the tape head assembly 10 on the magnetic media 14 thus depends upon numerous factors, including accurate recovery of the reference bursts 16. The reference burst signal 16, biased to a specific voltage, can be asymmetric however. In particular, the high (above bias) and low (below bias) sides of the signal 16 can be at different absolute voltages.

FIG. 2 is a signal diagram showing an asymmetric analog signal waveform 16. In particular, as shown in FIG. 2, the upper 22 and lower 24 (or positive and negative polarities) portions of the waveform 16 are asymmetric. The analog signal waveform 16, biased to a specific voltage of 2.5 V, is asymmetric. In particular, the high (above bias) 22 and low (below bias) 24 sides are at different absolute voltages.

The present invention provides a method and apparatus for signal threshold adjustment which compensates for an asymmetric signal waveform 16 such as that illustrated in FIG. 2. The present invention is not limited to application to signal threshold adjustment for a symmetric or asymmetric signal generated by a magnetic tape head assembly. Rather, the present invention may be used for signal threshold adjustment for any signal. For illustrative purposes, however, the principles of the present invention will be discussed utilizing a signal 16 generated by a magnetic tape head.

Figure 5:
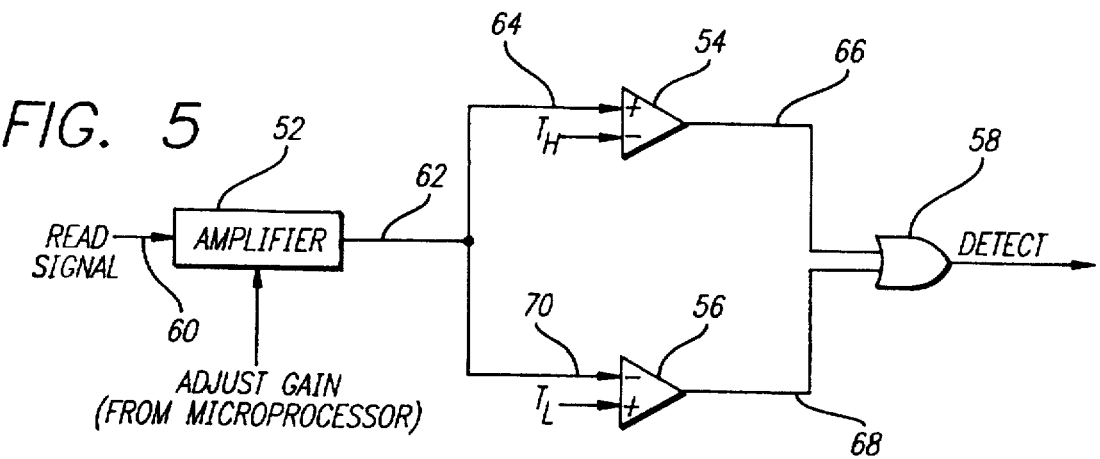
FIG. 5 is a schematic illustration of a signal threshold adjustment circuit in accordance with the present invention.
Figure 3:
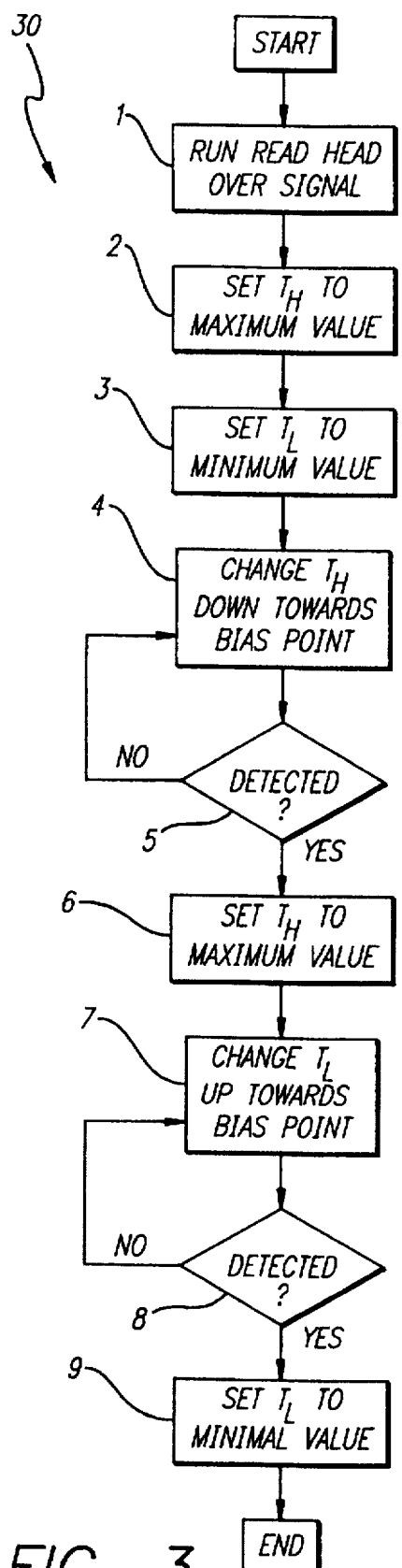
FIG. 3 is a flow chart of an algorithm for signal threshold adjustment that compensates for signal asymmetry in accordance with a preferred embodiment of the present invention.

Referring to FIG. 3, a flow chart of an algorithm 30 for signal threshold adjustment which compensates for signal asymmetry is illustrated. In particular, in step 1, a signal, such as the read signal, is initially generated. For example, as shown in FIGS. 1 and 2, the tape head assembly 10 including a read head 12 detects the information stored on the magnetic media 14 as the magnetic media 14 moves by the read head 12 at a predetermined speed. The information may be a record reference burst 16 having a fixed frequency. The data recovered from the magnetic tape is a read analog signal which is subsequently processed to discriminate between binary ones and zeros. This signal waveform is then applied to the signal adjustment method and apparatus of the present invention. In accordance with the present invention, to ensure that the proper signal detection point is used on both the high and low sides 22 and 24, the present invention detects each side independently. The method described herein is preferably implemented using a conventional digital detector which is able to accurately detect peak locations on a signal, even though the signal may be asymmetrical. Alternatively, the detector may be a comparator-type circuit arrangement, as shown in FIG. 5 and described in detail below.

Referring to FIG. 3, in step 2, the high side threshold voltage $T_H$ is set to a maximum value and in step 3, the low side threshold voltage $T_L$ is set to a minimum value. In the signal waveform 16 shown in FIG. 2, the high side threshold voltage $T_H$ is set to +5 V and the low side threshold voltage $T_L$ is set to 0 V, with the signal bias point voltage set to +2.5 V.

Referring to FIG. 3, in step 4, while the signal waveform is being monitored, the high side threshold voltage Thd His adjusted downwards, towards the signal bias point voltage to detect the high side or upper portion 22 of the signal waveform 16. The voltage is preferably adjusted downwards a predetermined value which may be determined in accordance with the particular application. If the high side or upper portion 22 of the signal waveform 16 is detected (step 5), the high side threshold voltage $T_H$ is set to the maximum value again (step 6). If the high side 22 of the signal waveform 16 is not detected in step 5, the high side threshold voltage $T_H$ is stepped down again towards the signal bias point voltage (repeat step 4). Step 4 is repeated until the high side 22 of the signal waveform 16 is detected. Preferably, a digital detector of conventional design is used to detect the upper or lower portion of the signal waveform. Alternatively, any commercially available detector may be used.

In a typical example, referring to FIGS. 2 and 3, the high side threshold voltage $T_H$, initially at +5 V, is adjusted down 80 millivolts, towards the signal bias point voltage of +2.5 V (step 4). Since the upper portion 22 of the signal waveform 16 is not present at this point, the high side threshold voltage $T_H$ is once again adjusted down 80 millivolts. The high side threshold voltage $T_H$ is successively stepped down a predetermined increment, such as 80 millivolts, towards the signal bias voltage until the upper portion 22 of the signal waveform 16 is detected. When the upper portion 22 of the signal waveform 16 is detected (step 5), the high side threshold voltage $T_H$ is set to a maximum value of +5 V again (step 6). The present invention is not limited to any of the values shown herein. For example, the 80 millivolt step is used for illustrative purposes only. Any value which will ensure detection of the high or low side of the signal waveform 16 may be used.

In step 7, while the signal waveform 16 is being monitored, the low side threshold voltage $T_L$ is adjusted upwards, towards the signal bias point voltage to detect the low side or lower portion 24 of the signal waveform 16. If the low side or lower portion 24 of the signal waveform 16 is detected (step 8), the low side threshold voltage $T_L$ is set to the minimum value again (step 9). If the low side 24 of the signal waveform 16 is not detected in step 8, the low side threshold voltage $T_L$ is stepped up again towards the signal bias point voltage (repeat step 7). Step 7 is repeated until the low side 24 of the signal waveform 16 is detected.

In a typical example, the low side threshold voltage $T_L$, initially at 0 V, is adjusted up 80 millivolts, towards the signal bias point voltage of +2.5 V (step 7). Since the lower portion 24 of the signal waveform 16 is not present at this point, the low side threshold voltage $T_L$ is once again adjusted up 80 millivolts. The low side threshold voltage $T_L$ is successively stepped up a predetermined increment, such as 80 millivolts, towards the signal bias voltage until the lower portion 24 of the signal waveform 16 is detected. When the lower portion 24 of the signal waveform 16 is detected (step 8), the low side threshold voltage $T_L$ is set to a minimum value of 0 V again (step 9). Thus, in accordance with an advantage of the present invention, the upper and lower portions 22 and 24 of a signal waveform 16 are detected independently, therefore ensuring proper signal detection.

Figure 4:
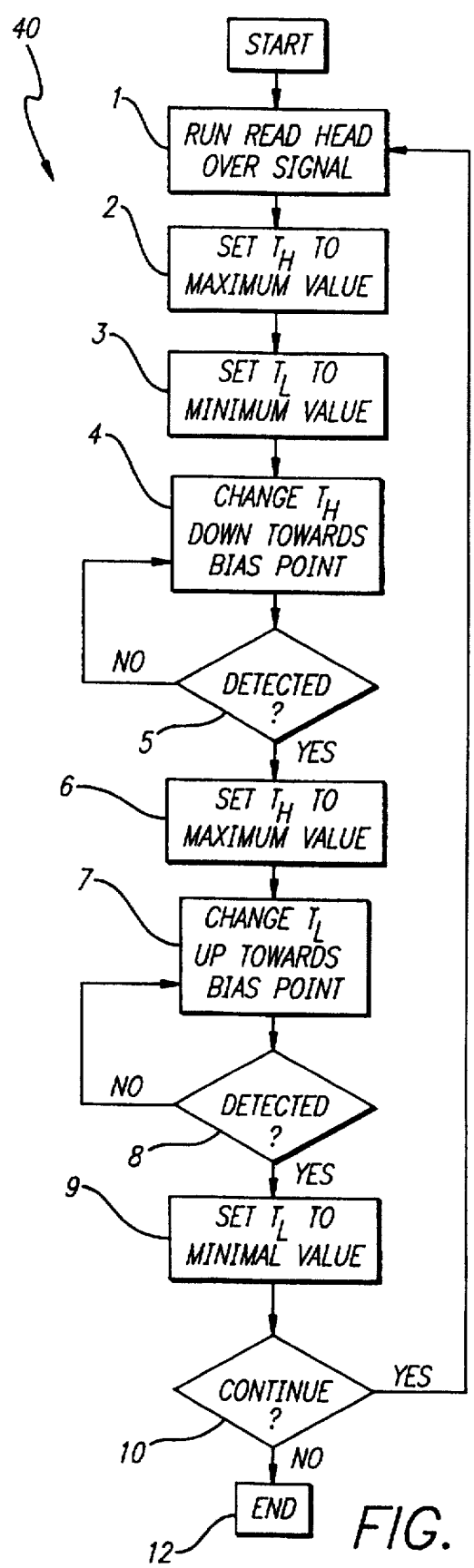
FIG. 4 is a flow chart of an algorithm for signal threshold adjustment for continuously monitoring a signal and compensating for any signal asymmetry in accordance with another embodiment of the present invention.

In accordance with another embodiment of the invention, the method and apparatus described herein can be used to continuously monitor a signal and compensate for any asymmetries. In particular, referring to FIG. 4, an algorithm 40 is provided for continuously monitoring a signal and compensating for any asymmetries. In particular, steps 1–9 are as described and illustrated in FIG. 3. In step 10, if the signal is still to be monitored, steps 1–9 are repeated as previously described. However, if it is no longer desirable to monitor the signal, the algorithm ends in step 12. Thus, in accordance with an advantage of the present invention, a signal may be continuously monitored. Additionally, as with the algorithm illustrated in FIG. 3 and described above, the upper and lower portions of a signal are detected independently, thus ensuring proper signal detection.

The present invention may be implemented utilizing the signal threshold adjustment circuit 50 shown in FIG. 5. In particular, the signal threshold adjustment circuit 50 includes an adjustable gain amplifier 52, high and low threshold comparators 54 and 56 and a logic OR circuit 58. Referring to FIG. 2, a signal 16, such as a read signal, is initially applied to the input 60 of the adjustable gain amplifier 52 which is coupled to a microprocessor (not shown) or similar means for adjusting a gain value thereof responsive to a control signal generated by the microprocessor. The output 62 of the adjustable gain amplifier 52 is applied to corresponding input terminals of a high threshold comparator 54 and a low threshold comparator 56. In particular, referring to FIG. 5, the output 62 of the adjustable gain amplifier 52 is applied to one input 64 of the high threshold comparator. The high threshold comparator 54 generates a high threshold detection trigger signal 66 whenever the read signal equals, or approximately equals, the high side threshold voltage $T_H$. The output 66 of the high threshold comparator 54, the high threshold 20 detection trigger signal 66, is applied to an input terminal of the logic OR circuit 58, which is triggered in response to the high threshold 66 or low threshold 68 detection trigger signal.

Similarly, the output 62 of the adjustable gain amplifier 52 is applied to one input 70 of the low threshold comparator 56. The low threshold comparator 56 generates a low threshold detection trigger signal 68 whenever the read signal equals, or approximately equals, the low side threshold voltage $T_L$. The output 68 of the low threshold comparator 56, the low threshold detection trigger signal 68, is applied to the other input terminal of the logic OR circuit 58, which is triggered in response to the high threshold 66 or low threshold 68 detection trigger signal.

The adjustable gain amplifier 52, high and low threshold comparators 54 and 56 and logic OR circuit 58 may be commercially available conventional circuits.

It will be appreciated by persons skilled in the art that the present invention is not limited to what has been shown and described hereinabove, nor the dimensions of sizes of the physical implementation described immediately above.

What is claimed is:

1. A program storage device readable by a machine, tangibly embodying a program of instructions executable by the machine to perform method steps for threshold adjustment for an amplified signal from a head assembly which compensates for asymmetry of the amplified signal relative to a bias voltage, said method steps comprising:

setting a first threshold voltage to a first value and a second threshold voltage to a second value; then adjusting said first threshold voltage in a first direction towards said second voltage while monitoring said amplified signal to detect a first portion of said amplified signal; then storing the thus adjusted first threshold voltage; then re-setting said first threshold voltage to said first value; then adjusting said second threshold voltage in a second direction opposite said first direction while monitoring said amplified signal to detect a second portion of amplified said signal; then storing the thus-adjusted second threshold voltage;

wherein the monitoring of said amplified signal further comprises the steps of:

utilizing an adjustable gain amplifier for amplifying said signal, simultaneously coupling the amplified signal to a first threshold comparator and a second threshold comparator, and outputting a resulting signal from either of said comparators.

2. The method claimed in claim 1, wherein said first threshold voltage is a high side threshold voltage and said second threshold voltage is a low side threshold voltage.

3. The method claimed in claim 2, wherein said first value is a maximum value and said second value is a minimum value.

4. The method claimed in claim 3, wherein said first portion is an upper portion and said second portion is a lower portion.

5. The program storage device of claim 1, wherein:
the first threshold voltage is a high side threshold voltage;
the first value is a maximum value;
the second threshold voltage is a low side threshold voltage;
the second value is a minimum value;
the first direction is downwards;
the first portion is an upper portion;
the second direction is upwards; and
the second portion is a lower portion.

6. The method claimed in claim 5, wherein said signal is a reference burst signal having a fixed frequency generated by said head assembly.

7. The method claimed in claim 6, wherein said head assembly is a magnetic head assembly including at least one read and one write head.

8. The method claimed in claim 5, wherein said steps of adjusting said high side threshold voltage downwards while monitoring said signal to detect said upper portion of said signal and adjusting said low side threshold voltage upwards while monitoring said signal to detect said lower portion of said signal further comprises the step of:
utilizing a digital burst detector to detect said upper and lower portions of said signal.

9. The method claimed in claim 8, wherein said high and low side threshold voltage is adjusted towards a signal bias point voltage of said signal.

10. The method claimed in claim 9, wherein said step of adjusting said high side threshold voltage downwards while monitoring said signal to detect an upper portion of said signal further comprises the step of:
successively stepping said head assembly downwards a predetermined increment.

11. The method claimed in claim 10, wherein said step of adjusting said low side threshold voltage upwards while monitoring said signal to detect a lower portion of said signal further comprises the step of:
successively stepping said head assembly upwards a predetermined increment.

12. The method claimed in claim 11, wherein said high side threshold voltage is +5 volts and is adjusted downwards at said predetermined increments of 80 millivolts towards said signal bias point voltage of +2.5 volts.

13. The method claimed in claim 12, wherein said low side threshold voltage is 0 volts and is adjusted upwards at said predetermined increments of 80 millivolts towards said signal bias point voltage of +2.5 volts.

14. The method claimed in claim 13, wherein said signal is continuously monitored.

15. The method of claim 1, wherein the first and second portions are contained within a reference burst signal.

16. An apparatus comprising:
a head assembly;
a computer;
a computer usable medium having computer readable program code means embodied therein for threshold adjustment of detecting an amplified signal from the head assembly which compensates for asymmetry of the amplified signal relative to a bias voltage, said computer readable program code means comprising:
means for causing the computer to set a first threshold voltage to a first value and a second threshold voltage to a second value,
means for causing the computer to adjust said first threshold voltage in a first direction towards said second voltage until a first portion of said amplified signal has been detected,
means for causing the computer to store a digital representation of the thus-adjusted first threshold voltage,
means for causing the computer to re-set said first threshold voltage to said first value,
means for causing the computer to adjust said second threshold voltage in a second direction opposite said first direction until a second portion of said signal has been detected, and
means for causing the computer to store a digital representation of the thus-adjusted second threshold voltage;
an adjustable gain amplifier for amplifying said signal;
a first threshold comparator;
a second threshold comparator.
means for simultaneously coupling the amplified signal to the first threshold comparator and to the second threshold comparator; and
means for outputting a resulting signal from either of said comparators.

17. The apparatus claimed in claim 16, wherein said signal is a reference burst signal having a fixed frequency generated by said head assembly.

18. The apparatus claimed in claim 17, wherein said head assembly is a magnetic head assembly including at least one read and one write head.

19. The apparatus claimed in claim 16, wherein said computer readable program code means for causing the computer to adjust said high side threshold voltage downwards while monitoring said signal to detect said upper portion of said signal and adjusting said low side threshold voltage upwards while monitoring said signal to detect said lower portion of said signal further comprises:
computer readable program code means for causing the computer to utilize a digital burst detector to detect said upper and lower portions of said signal.

20. The apparatus claimed in claim 19, further comprising:
computer readable program code means for causing the computer to adjust said high and low side threshold voltage towards a signal bias point voltage of said signal.

21. The apparatus claimed in claim 20, wherein said computer readable program code means for causing the computer to adjust said high side threshold voltage downwards while monitoring said signal to detect an upper portion of said signal further comprises:
computer readable program code means for causing the computer to successively step said head assembly downwards a predetermined increment.

22. The apparatus claimed in claim 21, wherein said computer readable program code means for causing the computer to adjust said low side threshold voltage upwards while monitoring said signal to detect a lower portion of said signal further comprises:

computer readable program code means for causing the computer to successively step said head assembly upwards a predetermined increment.

23. The apparatus claimed in claim 22, further comprising:

computer readable program code means for causing the computer to set said high side threshold voltage to +5 volts; and computer readable program code means for causing the computer to adjust said high side threshold voltage downwards at said predetermined increments of 80 millivolts towards said signal bias point voltage of +2.5 volts.

24. The apparatus claimed in claim 23, further comprising:

computer readable program code means for causing the computer to set said low side threshold voltage to 0 volts; and computer readable program code means for causing the computer to adjust upwards at said predetermined increments of 80 millivolts towards said signal bias point voltage of +2.5 volts.

25. The apparatus claimed in claim 24, further comprising:

computer readable program code means for causing the computer to continuously monitor said signal.

* * * * *